(12) United States Patent
Kim et al.

(10) Patent No.: US 11,532,440 B2
(45) Date of Patent: Dec. 20, 2022

(54) TANTALUM CAPACITOR HAVING A SUBSTRATE SPACED APART FROM A MOUNTING SURFACE

(71) Applicant: SAMSUNG ELECTRO-MECHANICS CO., LTD., Suwon-si (KR)

(72) Inventors: Youn Soo Kim, Suwon-si (KR); Hee Sung Choi, Suwon-si (KR); Hyun Ho Shin, Suwon-si (KR); Hong Kyu Shin, Suwon-si (KR); Jae Jun Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/228,852

(22) Filed: Apr. 13, 2021

(65) Prior Publication Data

US 2022/0139634 A1     May 5, 2022

(30) Foreign Application Priority Data

Nov. 2, 2020    (KR) ........................ 10-2020-0144402

(51) Int. Cl.
   *H01G 9/012*       (2006.01)
   *H01G 9/10*        (2006.01)
                 (Continued)

(52) U.S. Cl.
CPC ............. *H01G 9/008* (2013.01); *H01G 9/012* (2013.01); *H01G 9/048* (2013.01); *H01G 9/10* (2013.01); *H01G 2009/05* (2013.01)

(58) Field of Classification Search
CPC .......... H01G 9/012; H01G 9/008; H01G 9/10; H01G 9/048; H01G 2009/05
See application file for complete search history.

(56) References Cited

U.S. PATENT DOCUMENTS 3,341,752 A * 9/1967 Fournier ................ H01G 9/012
                                               361/540
9,305,712 B2    4/2016  Shin et al.
(Continued)

FOREIGN PATENT DOCUMENTS

GB           2123610 A  *  2/1984  ............ H01G 9/012
JP         H11-26303 A     1/1999
(Continued)

*Primary Examiner* — David M Sinclair
(74) *Attorney, Agent, or Firm* — Morgan, Lewis & Bockius LLP (57) ABSTRACT

A tantalum capacitor includes a capacitor body comprising a tantalum body having a tantalum wire and a molded portion; an anodic terminal connected to the tantalum wire and disposed on the first surface of the capacitor body; an anodic connection portion connected to the anodic terminal and disposed on the fifth surface of the capacitor body; a cathodic terminal connected to the tantalum body and disposed on the second surface of the capacitor body; a cathodic connection portion connected to the cathodic terminal and spaced apart from the anodic connection portion on the fifth surface of the capacitor body; and a substrate disposed on the sixth surface of the body and on which the tantalum body is mounted, wherein the anodic terminal and the cathodic terminal are electrically isolated on the substrate.

16 Claims, 10 Drawing Sheets

(51) Int. Cl.
*H01G 9/008* (2006.01)
*H01G 9/048* (2006.01)
*H01G 9/04* (2006.01)

(56) References Cited

U.S. PATENT DOCUMENTS

| | | | | | |
|---|---|---|---|---|---|
| 2002/0054470 | A1* | 5/2002 | Kuriyama | ................ | H01G 9/08 361/302 |
| 2004/0154149 | A1* | 8/2004 | Melody | ................ | H01G 9/012 29/25.03 |
| 2006/0262489 | A1* | 11/2006 | Vaisman | ................ | H01G 2/065 361/540 |
| 2008/0247122 | A1* | 10/2008 | Vaisman | ................ | H01G 9/15 361/533 |
| 2009/0116173 | A1* | 5/2009 | Shimizu | ................ | H01G 9/15 361/523 |
| 2009/0154065 | A1* | 6/2009 | Choi | ................ | H01G 9/012 361/523 |
| 2010/0165547 | A1* | 7/2010 | Kuranuki | ................ | H01G 9/15 361/525 |
| 2011/0261503 | A1* | 10/2011 | Aoyama | ................ | H01G 9/052 29/25.03 |
| 2012/0120553 | A1 | 5/2012 | Han et al. | | |
| 2012/0182668 | A1* | 7/2012 | Kim | ................ | H01G 9/012 216/13 |
| 2015/0049419 | A1* | 2/2015 | Biler | ................ | H01G 9/025 361/525 |
| 2015/0077905 | A1* | 3/2015 | Shin | ................ | H05K 1/181 361/529 |
| 2015/0083475 | A1* | 3/2015 | Kim | ................ | H01G 2/06 29/25.42 |
| 2015/0213961 | A1* | 7/2015 | Liu | ................ | H01G 9/012 29/25.03 |
| 2015/0270070 | A1* | 9/2015 | Shin | ................ | H01G 9/012 361/529 |
| 2017/0140877 | A1* | 5/2017 | Kuromi | ................ | H01G 9/10 |
| 2017/0178821 | A1* | 6/2017 | Summey | ................ | H01G 9/07 |
| 2020/0328031 | A1* | 10/2020 | Wu | ................ | H01G 4/008 |

FOREIGN PATENT DOCUMENTS

| | | | |
|---|---|---|---|
| JP | 2002170742 A | * | 6/2002 |
| JP | 2015008168 A | * | 1/2015 |
| KR | 10-2009-0131054 A | | 12/2009 |
| KR | 10-2012-0051168 A | | 5/2012 |

* cited by examiner

TANTALUM CAPACITOR HAVING A SUBSTRATE SPACED APART FROM A MOUNTING SURFACE

CROSS-REFERENCE TO RELATED APPLICATION

The application claims the benefit of priority to Korean Patent Application No. 10-2020-0144402, filed on Nov. 2, 2020, with the Korean Intellectual Property Office, the entire disclosure of which is incorporated herein by reference.

BACKGROUND

The present disclosure relates to a tantalum capacitor.

Tantalum (Ta), as a material, is a metal having mechanical or physical characteristics such as a high melting point, excellent ductility and excellent corrosion-resistance, and the like, and is thus widely used in various fields throughout industries such as the electrical, electronic, mechanical, chemical, aerospace, and defense industries. As the tantalum material may form a stable anodic oxide film, tantalum has been widely used as a material in forming anodes for small capacitors. Recently, in accordance with the rapid development of information technology (IT) industries, such as electronics information and communications technology (ICT) and electronics technology, tantalum has been increasingly used on a year-on-year basis.

Conventional tantalum capacitors employ a structure having an internal lead frame or a structure in which a terminal is externally extracted without using a frame, in order to connect the tantalum material and the electrode. In this case, existing frameless tantalum capacitors not employing a frame use a via or a patterned substrate in order to connect an electrode in connection with a tantalum body and an external terminal.

The connection through the via has a problem in that ESR characteristics may be deteriorated due to a limited contact region. In the case of using the patterned substrate, problems such as reduced process efficiency and increased manufacturing costs may arise due to the substrate manufacturing. Further, it may be difficult to reduce a thickness of the substrate due to an arrangement of the via and/or a printed circuit board. Accordingly, there may be a problem in that capacity of the tantalum capacitor may be limited, and reliability may be reduced; that is, mechanical strength may be reduced due to a complex structure thereof.

SUMMARY

An aspect of the present disclosure is to provide a tantalum capacitor with reduced equivalent series resistance (ESR).

An aspect of the present disclosure is to provide a tantalum capacitor having high capacitance.

An aspect of the present disclosure is to improve productivity by improving process efficiency.

An aspect of the present disclosure is to provide a tantalum capacitor having excellent reliability by improving mechanical strength.

According to an aspect of the present disclosure, a tantalum capacitor includes a capacitor body comprising a tantalum body having one surface through which a tantalum wire is exposed in a first direction, a molded portion covering the tantalum body, and first and second surfaces facing in the first direction, third and fourth surfaces facing in a second direction, and fifth and sixth surfaces facing in a third direction; an anodic terminal connected to the tantalum wire and disposed on the first surface of the capacitor body; an anodic connection portion connected to the anodic terminal and disposed on the fifth surface of the capacitor body; a cathodic terminal connected to the tantalum body and disposed on the second surface of the capacitor body; a cathodic connection portion connected to the cathodic terminal and spaced apart from the anodic connection portion on the fifth surface of the capacitor body; and a substrate disposed on the sixth surface of the capacitor body and on which the tantalum body is mounted, wherein the anodic terminal and the cathodic terminal of the substrate are electrically isolated.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described as follows with reference to the attached drawings. It is not intended to limit the techniques described herein to specific embodiments, and various modifications, equivalents, and/or alternatives to the embodiments of the present disclosure should be understood as being included. In connection with the description of the drawings, similar reference numerals may be used for similar components.

In the drawings, for clarity of description, parts irrelevant to the description may be omitted, and thicknesses of elements may be magnified to clearly represent layers and regions. Components having the same functions within a scope of the same idea may be described using the same reference numerals.

In the present specification, expressions such as "having", "may have", "include" or "may include" may indicate a presence of corresponding features (e.g., components such as numerical values, functions, operations, components, or the like), and may not exclude a presence of additional features.

In the present specification, expressions such as "A or B", "at least one of A or/and B" or "one or more of A or/and B", and the like, may include all possible combinations of items listed together. For example, "A or B", or "at least one of A or B" may refer to all cases including (1) at least one A (2) at least one B, or (3) both at least one A and at least one B.

In the drawings, an X direction may be defined as a first direction, an L direction or a length direction, a Y direction as a second direction, a W direction or a width direction, and a Z direction as a third direction, a T direction, or a thickness direction.

Figure 1:
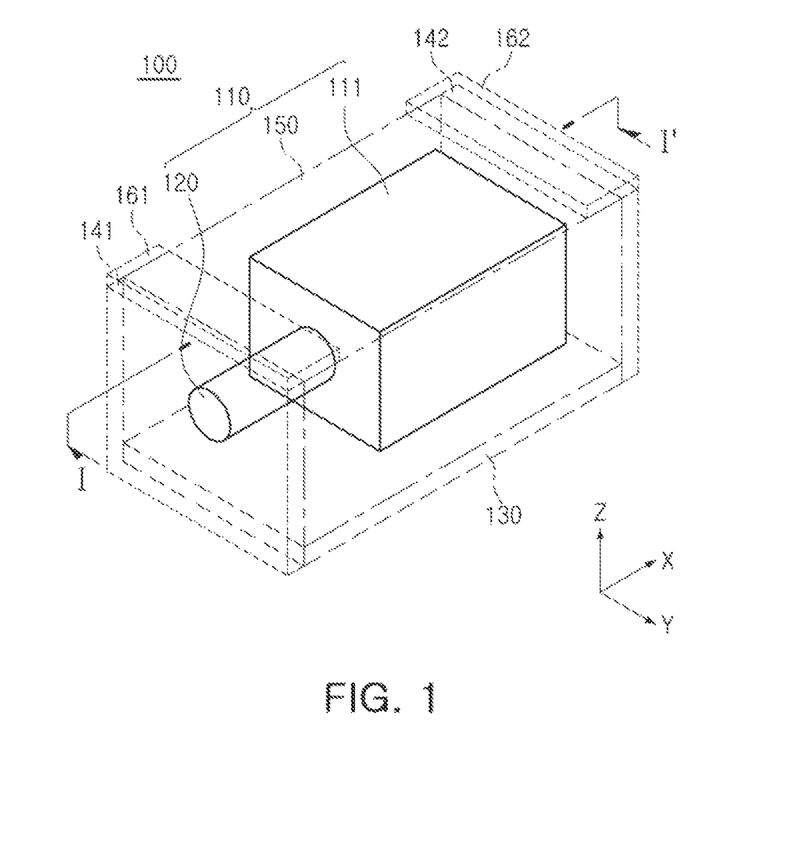
FIG. 1 is a perspective view illustrating a tantalum capacitor according to an embodiment of the present disclosure.
Figure 2:
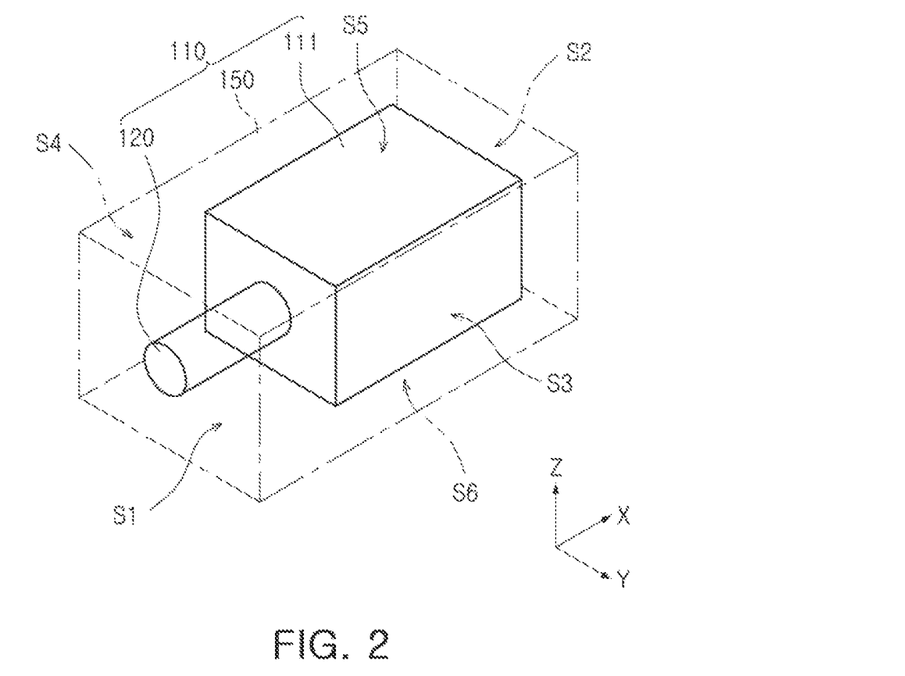
FIG. 2 is a perspective view illustrating a capacitor body of FIG. 1.
Figure 3:
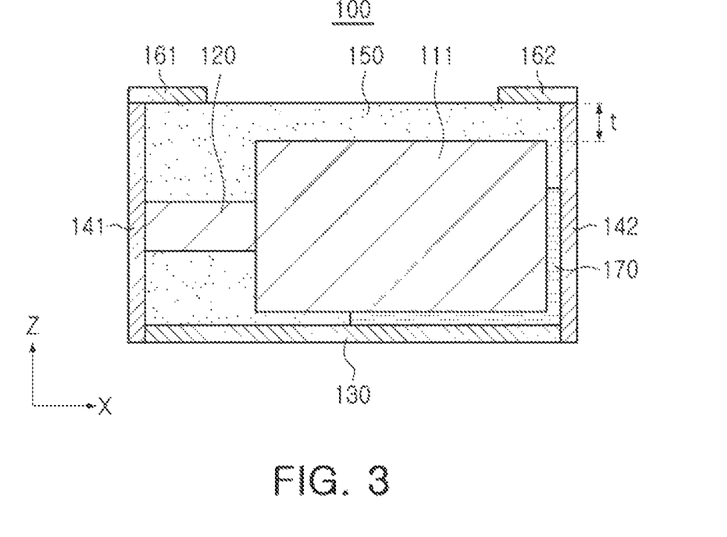
FIG. 3 is a cross-sectional view taken along I-I' of FIG. 1.

FIG. 1 is a schematic perspective view of a tantalum capacitor according to an embodiment of the present disclosure, and FIG. 2 is a perspective view illustrating a capacitor body of FIG. 1, while FIG. 3 is a cross-sectional view taken along I-I' of FIG. 1.

Referring to FIGS. 1 to 3, a tantalum capacitor 100 according to an embodiment of the present disclosure may include a capacitor body 110 including a tantalum body 111 having one surface through which a tantalum wire 120 is exposed in a first direction (X direction), a molded portion 150 covering the tantalum body 111, and first and second surfaces S1 and S2 facing in the first direction (X direction), third and fourth surfaces S3 and S4 facing in a second direction (Y direction), and fifth and sixth surfaces S5 and S6 facing in a third direction (Z direction); an anodic terminal 141 connected to the tantalum wire 120 and disposed on the first surface S1 of the capacitor body 110; an anodic connection portion 161 connected to the anodic terminal 141 and disposed on the fifth surface S5 of the capacitor body 110; a cathodic terminal 142 connected to the tantalum body 111 and disposed on the second surface S2 of the capacitor body 110; a cathodic connection portion 162 connected to the cathodic terminal 142 and spaced apart from the anodic connection portion 161 on the fifth surface S5 of the capacitor body 110; and a substrate 130 disposed on the sixth surface S6 of the capacitor body 110 and on which the tantalum body 111 is mounted.

The anodic terminal 141 and the cathodic terminal 142 may be electrically isolated. As used herein, the term "isolated" may refer to electrical insulation and may also mean having absolutely no electrical connection (approximately infinite electrical resistance), as well as having electrical resistance higher than that of peripheral components or conductors. The term "isolated" may mean having formed of a material through which no current flows and may also mean having electrical conductivity of, for example, $10^{-6}$ S/cm or less.

In the tantalum capacitor 100 according to the present disclosure, the substrate 130 electrically connected to the anodic terminal 141 and the cathodic terminal 142 may not include a conductive material. The substrate 130 free of a conductive material may mean that the substrate 130 may not have a conductive material as an element thereof. That is, the substrate 130 of the tantalum capacitor 100 may be an insulating substrate which does not include a conductor, such as a via, or the like, and/or an electric conduction path such as a printed circuit. The substrate 130 may be electrically isolated from the anodic terminal 141 and the cathodic terminal 142 of the tantalum capacitor 100 by applying an insulating substrate which does not include a via and/or a printed circuit, and may have improved mechanical strength and process efficiency by simplifying a structure of the substrate.

The tantalum capacitor 100 according to the present disclosure may include the capacitor body 110, where the capacitor body 110 includes the tantalum body 111 having one surface in the first direction (X direction) to which the tantalum wire 120 is exposed; and the molded portion 150 covering the tantalum body 111, and may include the first and second surfaces S1 and S2 facing in the first direction (X direction), and the third and fourth surfaces S3 and S4 facing in the second direction (Y direction), and the fifth and sixth surfaces S5 and S6 facing in the third direction (Z direction).

The tantalum body 111 may be formed using a tantalum material. A method of manufacturing the tantalum body 111 is not particularly limited; however, the tantalum body 111 may be manufactured by, for example, mixing tantalum (Ta) powder and a binder at a certain ratio and stirring, and compressing the mixed powder and forming the same into a substantially rectangular parallelepiped, followed by sintering under high temperature and high vacuum.

In addition, the tantalum body 111 may have a tantalum wire 120 exposed in the X direction of the tantalum body 111. The tantalum wire 120 may be mounted by being inserted into the mixture of the tantalum powder and the binder so as to be away from a center thereof, before compressing the powder mixed with the tantalum powder and the binder. That is, the tantalum body 111 may be manufactured by inserting and mounting the tantalum wire 120 in the tantalum powder mixed with a binder to form a tantalum element having a desired size, and then sintering the tantalum element under a high temperature and high vacuum ($10^{-5}$ torr or less) atmosphere for about 30 minutes.

A solid electrolyte layer (not illustrated) may be disposed on a surface of the tantalum body 111 for cathodicization. The solid electrolyte layer may contain one or more of a conductive polymer or manganese dioxide ($MnO_2$). When the solid electrolyte layer is formed of a conductive polymer, the solid electrolyte layer may be formed on a surface of the tantalum body 111 by a chemical polymerization method or an electrolytic polymerization method. The material of the conductive polymer material is not particularly limited, as long as the material is a polymer material having conductivity, and may include, for example, polypyrrole, polythiophene, polyacetylene, and/or polyaniline. When the solid electrolyte layer is formed of $MnO_2$, the tantalum body may be immersed in a manganese aqueous solution such as manganese nitrate, and the manganese aqueous solution is thermally decomposed to form conductive manganese dioxide on the surface of the tantalum body 111.

A cathodic reinforcing layer (not illustrated) may be additionally disposed on a surface of the solid electrolyte layer of the tantalum body 111 as necessary. The cathodic reinforcing layer may be a layer in which a carbon layer and a silver (Ag) layer are stacked. The carbon layer is for reducing contact resistance of the surface of the tantalum body 111, and the silver (Ag) layer is a material having high electrical conductivity and is generally used to form a conductive layer in the present technical field. However, the present disclosure is not necessarily limited thereto.

The capacitor body 110 of the tantalum capacitor 100 may include a molded portion 150 covering the tantalum body 111. The molded portion 150 may be disposed to surround the tantalum body 111. The molded portion 150 may be formed by transfer-molding a resin such as an epoxy resin molding compound (EMC) to surround the tantalum body 111. The molded portion 150 may serve to protect the tantalum wire 120 and the tantalum body 111 from an outside.

In an embodiment of the present disclosure, the substrate 130 of the tantalum capacitor 100 may be disposed to be in contact with the anodic terminal 141 and the cathodic terminal 142. The substrate 130 may be disposed on the sixth surface S6 of the capacitor body 110 and may be disposed to be in contact with both anodic terminal 141 and cathodic terminal 142. When the substrate 130 is an insulating substrate, a problem such as a short circuit may not occur, even in the case in which the substrate 130 is in contact with the anodic terminal 141 and the cathodic terminal 142. In addition, by using a substrate on which a separate printed circuit and/or a via is not disposed, sufficient mechanical strength can be secured, thereby reducing a thickness of the substrate and increasing an internal volume of the tantalum body.

In an embodiment, the substrate 130 of the tantalum capacitor 100 may contain a curable resin and an inorganic filler. The curable resin may be a thermosetting resin, a photocurable resin, or a dual curable resin including both thermosetting and photocuring characteristics. As used herein, the term "thermosetting resin" refers to a resin which can be cured through an appropriate heat application or an aging process, and the term "photocurable resin" refers to a resin which can be cured by irradiation of electromagnetic waves. Microwaves, infrared (IR), ultraviolet (UV), X-rays and γ-rays, as well as particle beams such as α-particle beams, proton beams, neutron beams and electron beam may be included in categories of the electromagnetic waves. The photocurable resin may be a cationic curable and/or radical curable resin, but is not limited thereto.

Specific examples of the curable resin for the molded portion 150 are epoxy resins such as a cresol novolac epoxy resin, a bisphenol A-type epoxy resin, a bisphenol A-type novolac epoxy resin, a phenol novolac epoxy resin, a multifunctional epoxy resin, a biphenyl type epoxy resin, a xylog-type epoxy resin, a triphenol methane-type epoxy resin, an alkyl-modified triphenol methane epoxy resin, a naphthalene-type epoxy resin, a dicyclopentadiene-type epoxy resin, and a dicyclopentadiene-modified phenol-type epoxy resin, but are not limited thereto.

In one example, the inorganic filler of the substrate may include at least one or more selected from the group consisting of silica ($SiO_2$), alumina ($Al_2O_3$), silicon carbide (SiC), barium sulfate ($BaSO_4$), talc, mud, mica powder, aluminum hydroxide ($AlOH_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$). When the tantalum capacitor according to the present disclosure includes the inorganic filler, strength of the substrate can be improved, thereby enabling an application of a thin substrate.

In an embodiment, the anodic terminal 141 of the tantalum capacitor 100 may be disposed on the first surface S1 of the capacitor body no and may be in contact with the tantalum wire 120 and, at the same time, in contact with the substrate 130. As previously described, the substrate 130 of the present disclosure is an insulating substrate, and thus does not cause a problem, such as a short circuit, even when disposed to be in contact with the anode terminal 141 connected to the outside. In addition, overall rigidity of the capacitor can be increased by disposing the substrate to be in direct contact with the anode terminal 141 formed of a metal. In a conventional frameless structure, a method of connecting the tantalum wire and the external electrode using a separate connection member was used, leading to a limited contact area of the connection. In contrast, the tantalum capacitor 100 according to the present disclosure has a structure in which the tantalum wire 120 is in direct contact with the anodic terminal 141, thereby increasing a contact area and reducing ESR. The tantalum wire 120 and the anodic terminal 141 may be connected by spot welding or laser welding, or applying a conductive adhesive, but is not limited thereto.

In one example, the capacitor body 110 of the tantalum capacitor 100 according to the present disclosure may further include a conductive adhesive layer 170 disposed between the tantalum body 111 and the cathodic terminal 142. The conductive adhesive layer 170 may include an epoxy resin and a conductive metal powder, but is not limited thereto.

In the above example, the cathodic terminal 142 of the tantalum capacitor 100 may be disposed in contact with the conductive adhesive layer 170 and the substrate 130. As previously described, the substrate 130 is an insulating substrate and thus does not cause a problem such as a short circuit even when disposed in contact with the cathodic terminal 142 connected to the outside. In addition, overall rigidity of the capacitor can be increased by disposing the substrate to be in direct contact with the cathodic terminal 142 formed of a metal. Further, since the tantalum body 111 and the cathodic terminal 142 have a large contact area through the conductive adhesive layer 170, ESR can be effectively reduced.

In one embodiment of the present disclosure, the tantalum capacitor 100 may include an anodic connection portion 161 disposed on the fifth surface S5 of the capacitor body 110 and a cathodic connection portion 162 connected to the cathodic terminal 142 and spaced apart from the anodic connection portion 161 and disposed on the fifth surface S5 of the capacitor body 110. The tantalum capacitor 100 may include a substrate 130 disposed on the sixth surface S6 of the capacitor body 110 including the tantalum wire 120, the tantalum body 111 and the molded portion 150, the anodic terminal 141 disposed on the first surface S1 of the capacitor body 110, and the cathodic terminal 142 disposed on the second surface S2 of the capacitor body 110.

In this case, the anodic connection portion 161 connected to the anodic terminal 141 and the cathodic connection portion 162 connected to the cathodic terminal 142 may be disposed on one surface of the capacitor body 110 in the third direction (Z direction), specifically on the fifth surface S5 of the capacitor body 110. The anodic connection portion 161 and the cathodic connection portion 162 may be connected to an electrode pad of an external substrate when mounted on the external substrate. That is, the fifth surface S5 of the capacitor body 110 may be a mounting surface for the external substrate, and the anodic connection portion 161 and the cathodic connection portion 162 may function as lower electrodes. When the tantalum capacitor 100 has such a shape, the substrate 130 of the tantalum capacitor 100 may be spaced apart from the mounting surface with the external substrate. By minimizing a distance "t" between the tantalum body 110 of the tantalum capacitor 100 and the external substrate, capacitance may be achieved through an increase in a volume of the tantalum body.

Figure 4:
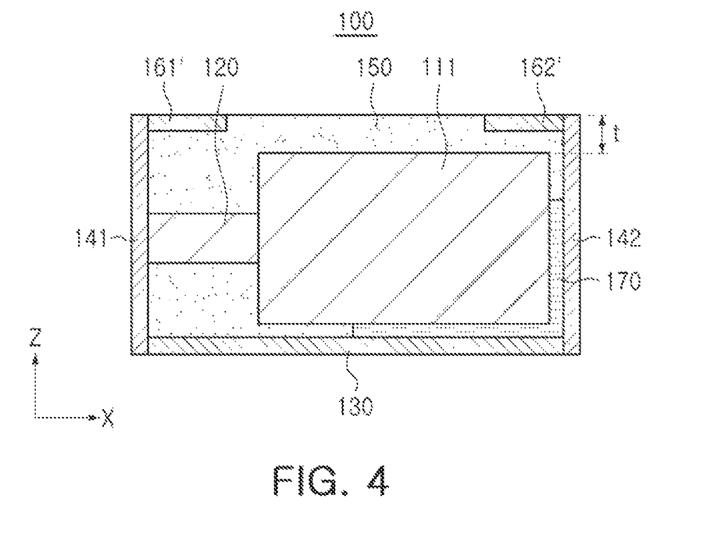
FIG. 4 is a cross-sectional view illustrating a modified form of a tantalum capacitor according to an embodiment.

In a modified form of the present embodiment, one external surface of the anodic connection portion 161' and that of the cathodic connection portion 162' may be disposed on the same plane as the fifth surface S5 of the capacitor body 110. FIG. 4 is a cross-sectional view of the tantalum capacitor 100 according to the present modified embodiment. Referring to FIG. 4, one surface of the anodic connection portion 161' and that of the cathodic connection portion 162' in the third direction (Z direction) are disposed to be in contact with an inside of the molded portion 150, and the other surfaces thereof may be disposed on the same plane as the fifth surface S5 of the capacitor body 110. In the case of the present modified embodiment, at least one portions of the anodic connection portion 161' and the cathodic connection portion 162' may be inserted into the molded portion 150 of the capacitor body 110. Such an arrangement of being inserted into the molded portion 150 may refer to a state in which at least one portions of the anodic connection portion 161' and the cathodic connection portion 162' may be disposed inside the molded portion 150. As in the present modified form, a tantalum capacitor 110 having no external step can be provided when the one external surfaces of the anodic connection portion 161' and the cathodic connection portion 162' are disposed on the same plane as the fifth surface S5 of the capacitor body 110, thereby increasing space utilization.

Figure 6:
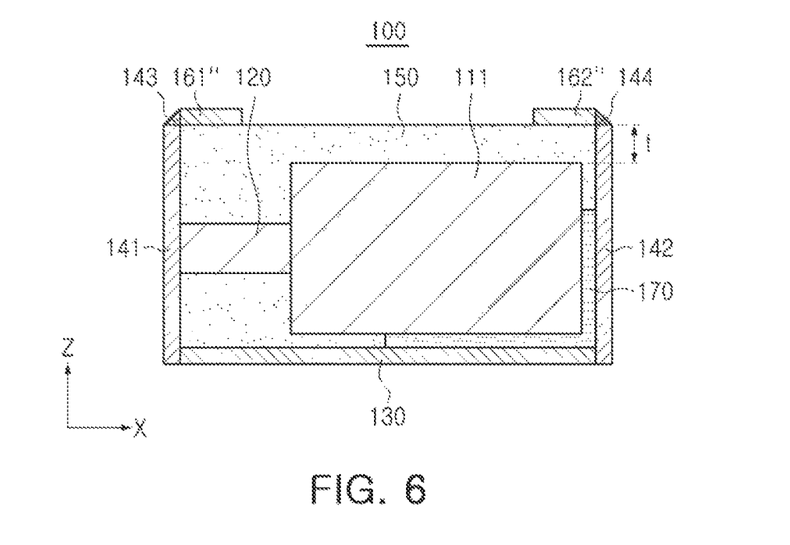
FIG. 6 is a cross-sectional view illustrating a modified form of a tantalum capacitor according to another embodiment.
Figure 7:
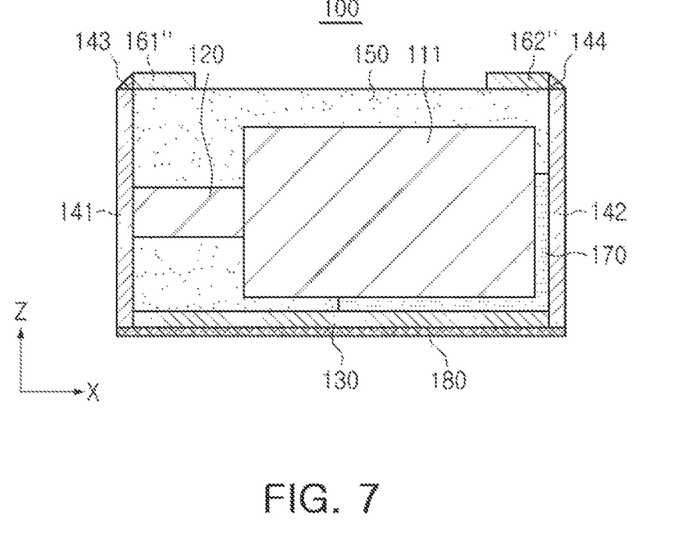
FIG. 7 is a cross-sectional view illustrating a modified form of a tantalum capacitor according to another embodiment.

In one example, the tantalum capacitor 100 according to the present disclosure may further include an anodic folded portion 143 disposed at a boundary of the anodic terminal 141 and an anodic connection portion 161" and disposed to be inclined with respect to the first and fifth surfaces S1 and S5 of the capacitor body 110; and a cathodic folded portion 144 disposed at a boundary of the cathodic terminal 142 and a cathodic connection portion 162" and disposed to be inclined with respect to the second and fifth surfaces S2 and S5 of the capacitor body 110. Referring to FIG. 6, in the tantalum capacitor 100, the anodic folded portion 143 may be disposed at the boundary of the anodic terminal 141 and the anodic connection portion 161", and the cathodic folded portion 144 may be disposed at the boundary of the cathodic terminal 142 and a cathodic connection portion 162". The anodic folded portion 143 may be disposed to be inclined with respect to both ends of the first and fifth surfaces S1 and S5 of the capacitor body 110 at a boundary of the first and fifth surfaces S1 and S5 of the capacitor body 110, and the cathodic folded portion 144 may be disposed to be inclined with respect to both ends of the second and fifth surfaces S2 and S5 of the capacitor body 110 at the boundary of the second and fifth surfaces S2 and S5 of the capacitor body 110. As previously described, the tantalum capacitor 110 according to the present disclosure employs the fifth surface S5 of the capacitor body 110 as a mounting surface for the external substrate, the anodic folded portion 143 and the cathodic folded portion 144 can function as solder pockets, and may improve mounting strength when mounted on the external substrate.

Figure 5:
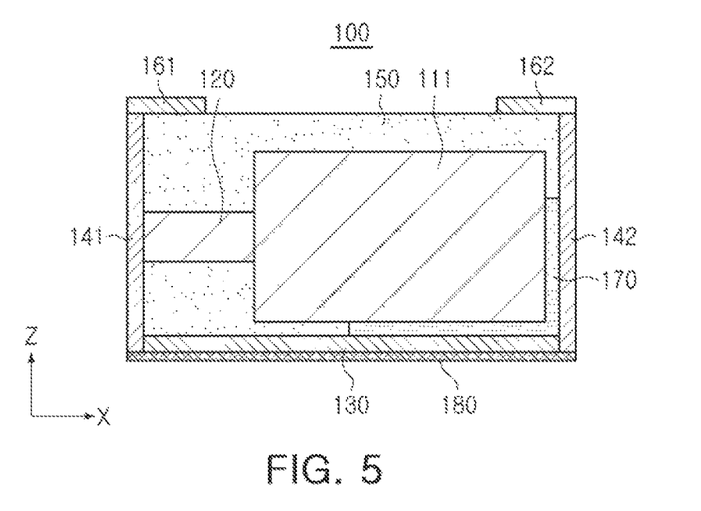
FIG. 5 is a cross-sectional view illustrating a modified form of a tantalum capacitor according to an embodiment.

In a modified form of the present disclosure, the tantalum capacitor 100 according to the present disclosure may further include a moisture-resistant coating layer 180 disposed on the external surface of the substrate 130. FIG. 5 is a cross-sectional view of the tantalum capacitor 100 of the present modified form. Referring to FIG. 5, the tantalum capacitor 100 may include the moisture-resistant coating layer 180, and the moisture-resistant coating layer 180 may be attached to an external surface of the tantalum capacitor. In this case, the moisture-resistant coating layer 180 may be disposed on the external surface of the substrate 130. As used herein, the expression "external surface of the substrate" may refer to a surface opposite to the surface on which the tantalum body 111 is mounted in the third direction (Z direction). When the moisture-resistant coating layer 180 is disposed on the external surface of the substrate 130 of the tantalum capacitor 100 according to the present disclosure as in the present modified embodiment, moisture penetration through a surface to which a plurality of different materials are bonded can be prevented.

The moisture-resistant coating layer 180 may be formed to contain a material having a hydrophobic functional group and may be a surface-modified coating layer which modifies an external surface of the tantalum capacitor according to the present disclosure to a hydrophobic surface. The moisture-resistant coating layer may be a coating layer containing a silane-based compound using a silane coupling agent. Examples of the silane coupling agent may be 3-glycidoxypropyltrimethoxysilnae (GPTMS), 3-glycidoxypropyltriethoxysilnae (GPTES), vinyltriethoxysilane, aminopropyltrimethoxysilane (APTMS), and the like, but are not limited thereto.

Figure 8:
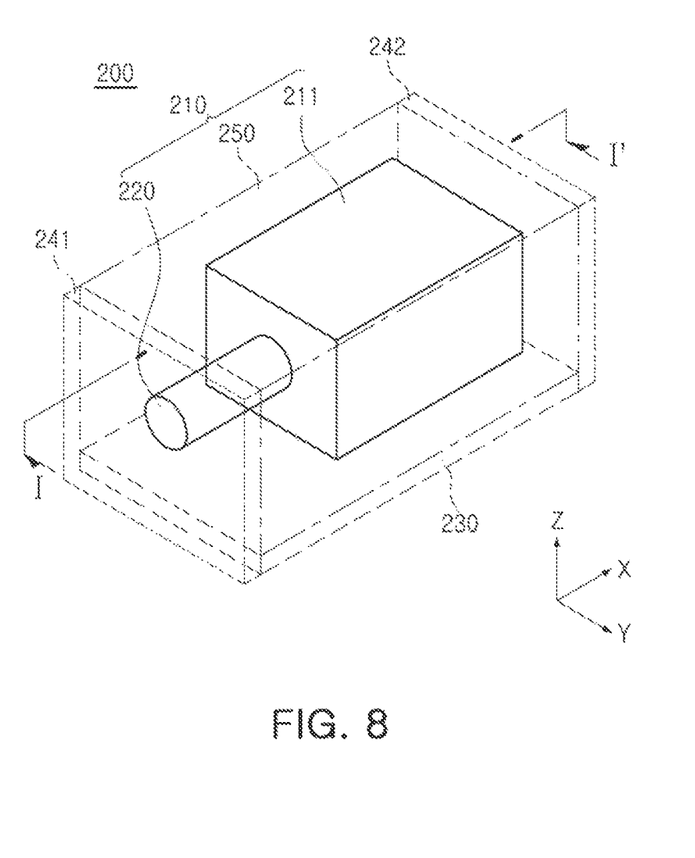
FIG. 8 is a perspective view illustrating a tantalum capacitor according to another embodiment.
Figure 9:
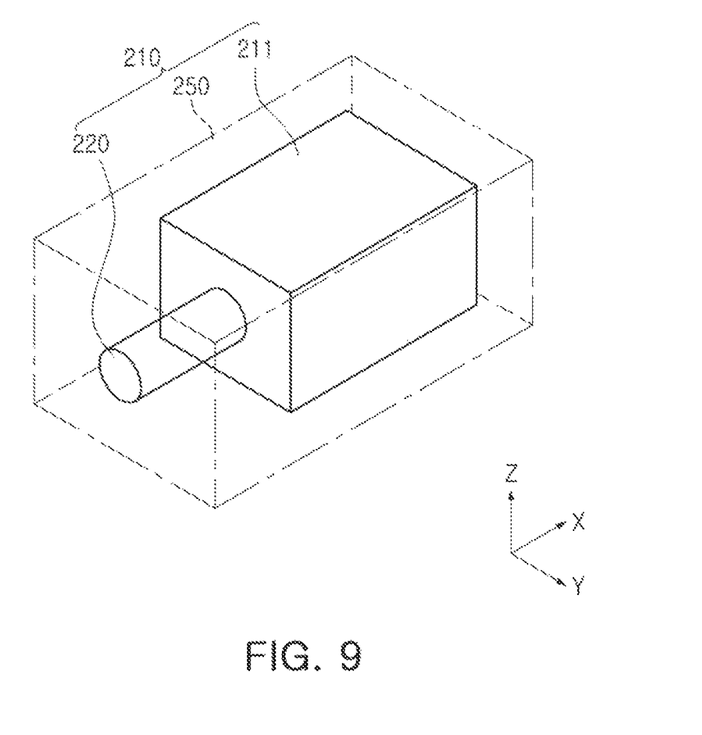
FIG. 9 is a perspective view illustrating a capacitor body of FIG. 8.
Figure 10:
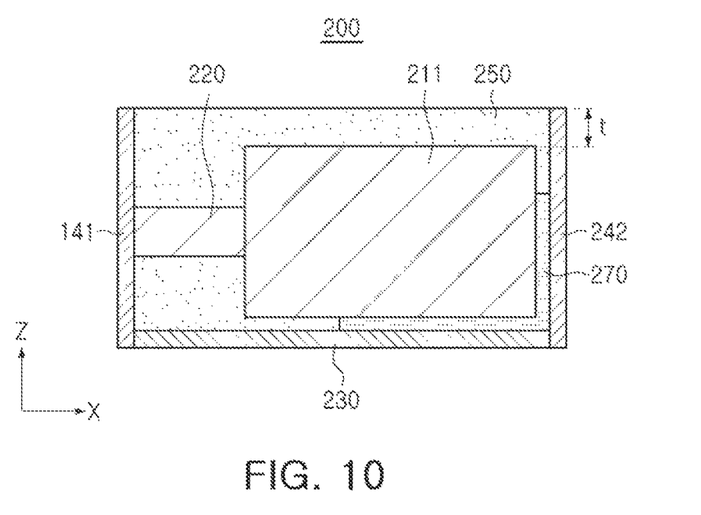
FIG. 10 is a cross-sectional view taken along II-II' of FIG. 5.
Figure 11:
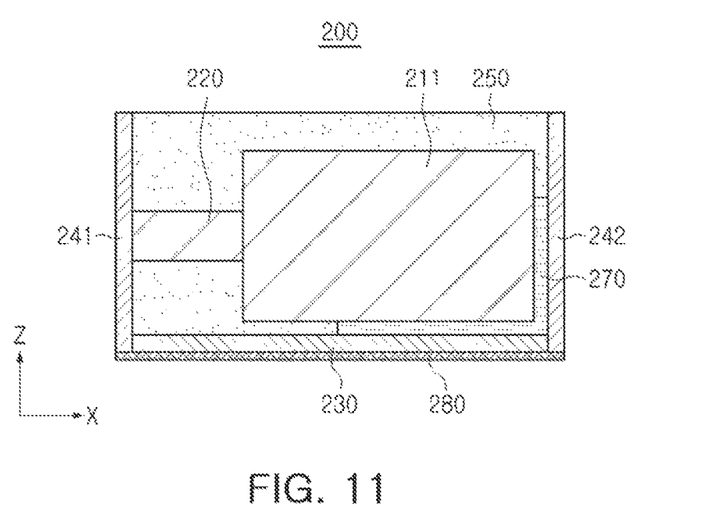
FIG. 11 is a cross-sectional view illustrating a modified form of a tantalum capacitor according to an embodiment.

FIGS. 8 to 11 are diagrams illustrating a tantalum capacitor according to another embodiment of the present disclosure. FIG. 8 is a perspective view illustrating a tantalum capacitor according to another embodiment, and FIG. 9 is a perspective view illustrating a capacitor body of FIG. 8, while FIG. 10 is a cross-sectional view taken along I-I' of FIG. 8, and FIG. 11 is a cross-sectional view illustrating a modified form of a tantalum capacitor according to an embodiment.

Referring to FIGS. 8 to 11, a tantalum capacitor 200 according to the present embodiment may include a capacitor body 210 including a tantalum body 211 having one surface through which a tantalum wire 220 is exposed in a first direction (X direction), a molded portion 250 covering the tantalum body 111, and first and second surfaces S1 and S2 facing in the first direction (X direction), third and fourth surfaces S3 and S4 facing in a second direction (Y direction), and fifth and sixth surfaces S5 and S6 facing in a third direction (Z direction); an anodic terminal 241 connected to the tantalum wire 220 and disposed on the first surface S1 of the capacitor body 210; a cathodic terminal 242 connected to the tantalum body 211 and disposed on the second surface S2 of the capacitor body 110; and a substrate 230 disposed on the sixth surface S6 of the capacitor body 210 and on which the tantalum body 211 is mounted.

In an example, the capacitor body 210 of the tantalum capacitor 200 according to the present disclosure may further include a conductive adhesive layer 270 disposed between the tantalum body 211 and the cathodic terminal 242.

In a modified form of the above embodiment, the tantalum capacitor 200 may further include a moisture resistant coating layer 280 disposed on an external surface of the substrate 230. FIG. 11 is a cross-sectional view of the tantalum capacitor 200 of the present modified form of the present embodiment.

The tantalum wire 220, the tantalum body 211, the molded portion 250, the anodic terminal 241, the cathodic terminal 242, the substrate 230, the conductive adhesive layer 270 and the moisture resistant coating layer 280 are the same as those described above, and detailed descriptions thereof will be omitted.

Figure 12:
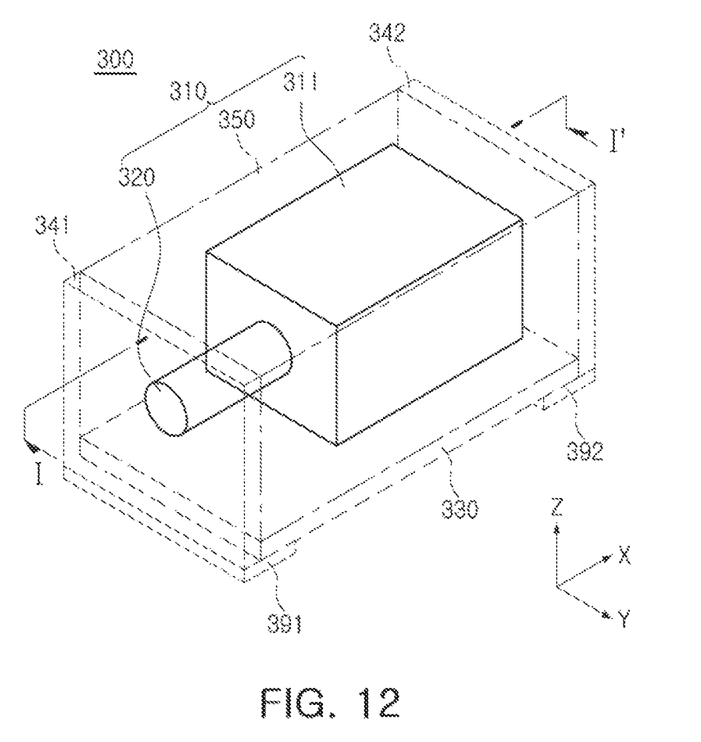
FIG. 12 is a perspective view illustrating a modified form of a tantalum capacitor according to another embodiment.
Figure 13:
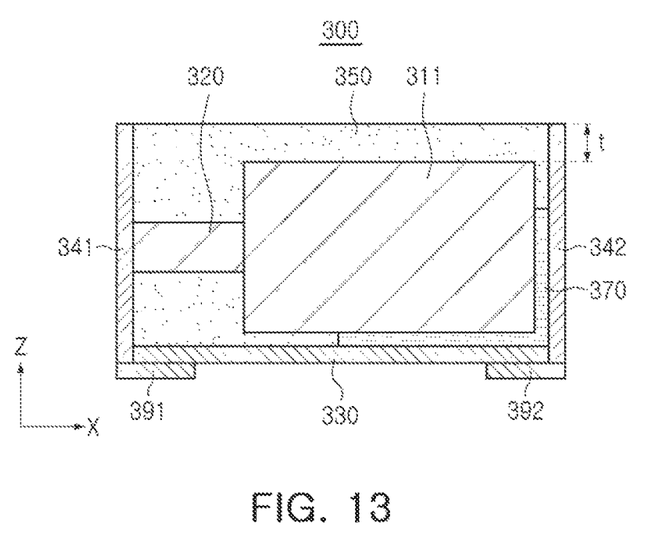
FIG. 13 is a perspective view illustrating a capacitor body of FIG. 12.

In another embodiment of the present disclosure, a tantalum capacitor 300 may further include an anodic extension portion 391 connected to an anodic terminal 341 and disposed on a sixth surface S6 of the capacitor body 310; and a cathodic extension portion 392 connected to a cathodic terminal 342 and spaced apart from the anodic extension portion 391 on the sixth surface S6 of the capacitor body 310. FIG. 12 is a perspective view of the tantalum capacitor 300 according to the present embodiment, and FIG. 13 is a cross-sectional view of FIG. 12. Referring to FIGS. 12 and 13, the tantalum capacitor 300 according to the present embodiment includes a substrate 330 disposed on the sixth surface S6 of the capacitor body 310 including the tantalum wire 320, the tantalum body 311 and the molded portion 350, an anodic terminal 341 disposed on a first surface S1 of the capacitor body 310, and a cathodic terminal 342 disposed on a second surface S2 of the capacitor body 310.

In this case, the anodic extension portion 391 connected to the anodic terminal 341 and the cathodic extension part 392 connected to the cathodic terminal 342 may be disposed on one surface of the capacitor body 310 in a third direction (Z direction), specifically on the sixth surface S6 of the capacitor body 310. The anodic extension portion 391 and the cathodic extension portion 392 may be connected to an electrode pad of an external substrate when mounted on the substrate.

The anodic terminal, the cathodic terminal, the anodic connection portion, the cathodic connection portion, the anodic extension portion and/or the cathodic extension portion of the tantalum capacitor according to the present disclosure may be formed of a conductive metal including nickel (Ni), tin (Sn), copper (Cu), a chromium titanium intermetallic compound (Cr(Ti)), palladium (Pd), iron (Fe) and/or alloys thereof. The anodic terminal, the cathodic terminal, the anodic connection portion, the cathodic connection portion, the anodic extension portion and/or the cathodic extension portion may be formed of a plating layer. Plating methods such as sputtering, subtractive, additive, a semi-additive process (SAP), a modified semi-additive process (MSAP), or the like, may be used, but are not limited thereto. When forming the anodic terminal, the cathodic terminal, the anodic connection portion, the cathodic connection portion, the anodic extension portion and/or the cathodic extension portion as plating layers, terminals and connection portions can be formed to be thin and to have high density and low resistance.

As set forth above, as one of various effects of the present disclosure, a tantalum capacitor with reduced equivalent series resistance (ESR) may be provided.

As one of various effects of the present disclosure, a tantalum capacitor having a capacitance may be provided.

As one of various effects of the present disclosure, a tantalum capacitor capable of improving productivity may be provided.

As one of various effects of the present disclosure, a tantalum capacitor having excellent reliability by improving mechanical strength may be provided.

However, various and advantageous advantages and effects of the present invention are not limited to the above description, and will be more readily understood in the course of describing specific embodiments of the present disclosure.

While exemplary embodiments have been shown and described above, it will be apparent to those skilled in the art that modifications and variations could be made without departing from the spirit and scope of the present disclosure as defined by the appended claims.

What is claimed is:

1. A tantalum capacitor, comprising:
   a capacitor body comprising a tantalum body having one surface through which a tantalum wire is exposed in a first direction, a molded portion covering the tantalum body, and first and second surfaces facing in the first direction, third and fourth surfaces facing in a second direction, and fifth and sixth surfaces facing in a third direction;
   an anodic terminal connected to the tantalum wire and disposed on the first surface of the capacitor body;
   an anodic connection portion connected to the anodic terminal and disposed on the fifth surface of the capacitor body;
   a cathodic terminal connected to the tantalum body and disposed on the second surface of the capacitor body;
   a cathodic connection portion connected to the cathodic terminal and spaced apart from the anodic connection portion on the fifth surface of the capacitor body; and
   a substrate disposed on the sixth surface of the capacitor body and on which the tantalum body is mounted,
   wherein the anodic connection portion and the cathodic connection portion are disposed on only the fifth surface among the fifth and sixth surfaces, and the substrate is disposed on only the sixth surface among the fifth and sixth surfaces such that the fifth surface is devoid of a substrate thereon,
   wherein side surfaces of the anodic connection portion and the cathodic connection portion are exposed to an outside of the capacitor body, and
   wherein opposite end portions of the substrate in the first direction are covered by the anodic terminal and the cathodic terminal at the first and second surfaces, respectively.

2. The tantalum capacitor of claim 1, wherein the substrate is free of a conductive material.

3. The tantalum capacitor of claim 1, wherein the substrate is free of a printed circuit.

4. The tantalum capacitor of claim 1, wherein the anodic terminal is disposed to be in contact with the tantalum wire and the substrate.

5. The tantalum capacitor of claim 1, wherein the capacitor body further comprises a conductive adhesive layer disposed between the tantalum body and the cathodic terminal.

6. The tantalum capacitor of claim 5, wherein the cathodic terminal is disposed to be in contact with the conductive adhesive layer and the substrate.

7. The tantalum capacitor of claim 5, wherein the conductive adhesive layer includes an epoxy resin and a conductive metal powder.

8. The tantalum capacitor of claim 1, wherein an external surface of the anodic connection portion and an external surface of the cathodic connection portion are disposed on a same plane as the fifth surface of the capacitor body.

9. The tantalum capacitor of claim 1, further comprising:
   an anodic folded portion disposed at a boundary of the anodic terminal and the anodic connection portion and disposed to be inclined with respect to the first and fifth surfaces of the capacitor body; and
   a cathodic folded portion disposed at a boundary of the cathodic terminal and the cathodic connection portion and disposed to be inclined with respect to the second and fifth surfaces of the capacitor body.

10. The tantalum capacitor of claim 1, further comprising a moisture-resistant coating layer disposed on an external surface of the substrate.

11. The tantalum capacitor of claim 1, further comprising:
    an anodic extension portion connected to the anodic terminal and disposed on the sixth surface of the capacitor body; and
    a cathodic extension portion connected to the cathodic terminal and spaced apart from the anodic extension portion on the sixth surface of the capacitor body.

12. The tantalum capacitor of claim 11, further comprising a moisture-resistant coating layer disposed on an external surface of the substrate.

13. The tantalum capacitor of claim 1, wherein the substrate contains a curable resin and an inorganic filler.

14. A tantalum capacitor, comprising:
- a capacitor body comprising a tantalum body having one surface through which a tantalum wire is exposed in a first direction, a molded portion covering the tantalum body, and first and second surfaces disposed in the first direction, third and fourth surfaces disposed in a second direction, and fifth and sixth surfaces disposed in a third direction;
- an anodic terminal connected to the tantalum wire and disposed on the first surface of the capacitor body;
- an anodic connection portion connected to the anodic terminal and disposed on the fifth surface of the capacitor body;
- a cathodic terminal connected to the tantalum body and disposed on the second surface of the capacitor body;
- a cathodic connection portion connected to the cathodic terminal and spaced apart from the anodic connection portion on the fifth surface of the capacitor body;
- a substrate disposed on the sixth surface of the capacitor body and on which the tantalum body is mounted; and
- a moisture-resistant coating layer disposed on an external surface of the substrate, so as to be disposed on only the sixth surface among the fifth and sixth surfaces,
- wherein side surfaces of the anodic connection portion and the cathodic connection portion are exposed to an outside of the capacitor body, and
- wherein the anodic terminal and the cathodic terminal are disposed on opposite end portions of the substrate in the first direction.

15. The tantalum capacitor of claim 14, further comprising:
- an anodic extension portion connected to the anodic terminal and disposed on the sixth surface of the capacitor body; and
- a cathodic extension portion connected to the cathodic terminal and spaced apart from the anodic extension portion on the sixth surface of the capacitor body.

16. A tantalum capacitor, comprising:
- a capacitor body comprising a tantalum body having one surface through which a tantalum wire is exposed in a first direction, a molded portion covering the tantalum body, and first and second surfaces facing in the first direction, third and fourth surfaces facing in a second direction, and fifth and sixth surfaces facing in a third direction;
- an anodic terminal connected to the tantalum wire and disposed on the first surface of the capacitor body;
- an anodic connection portion connected to the anodic terminal and disposed on the fifth surface of the capacitor body;
- a cathodic terminal connected to the tantalum body and disposed on the second surface of the capacitor body;
- a cathodic connection portion connected to the cathodic terminal and spaced apart from the anodic connection portion on the fifth surface of the capacitor body; and
- a substrate disposed on the sixth surface of the capacitor body and on which the tantalum body is mounted,
- wherein the anodic connection portion and the cathodic connection portion are disposed on only the fifth surface among the fifth and sixth surfaces so as to directly contact the fifth surface,
- wherein side surfaces of the anodic connection portion and the cathodic connection portion are exposed to an outside of the capacitor body, and
- wherein opposite end portions of the substrate in the first direction are covered by the anodic terminal and the cathodic terminal at the first and second surfaces, respectively.

\* \* \* \* \*